(12) United States Patent
Wakimoto et al.

(10) Patent No.: US 10,079,370 B2
(45) Date of Patent: Sep. 18, 2018

(54) SECONDARY BATTERY

(71) Applicant: SANYO Electric Co., Ltd., Daito-shi, Osaka (JP)

(72) Inventors: Ryoichi Wakimoto, Hyogo (JP); Eiji Okutani, Hyogo (JP); Shinichiro Yoshida, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 358 days.

(21) Appl. No.: 14/944,846

(22) Filed: Nov. 18, 2015

(65) Prior Publication Data

US 2016/0155998 A1    Jun. 2, 2016

(30) Foreign Application Priority Data

Nov. 28, 2014  (JP) ................. 2014-241078

(51) Int. Cl.
| | |
|---|---|
| *H01M 2/02* | (2006.01) |
| *H01M 4/66* | (2006.01) |
| *H01M 10/04* | (2006.01) |
| *H01M 2/26* | (2006.01) |
| *H01M 2/22* | (2006.01) |
| *H01M 2/30* | (2006.01) |
| *H01M 2/04* | (2006.01) |

(52) U.S. Cl.
CPC ....... *H01M 2/0217* (2013.01); *H01M 2/0237* (2013.01); *H01M 2/22* (2013.01); *H01M 2/263* (2013.01); *H01M 2/30* (2013.01); *H01M 4/661* (2013.01); *H01M 10/0431* (2013.01); *H01M 2/043* (2013.01); *H01M 2220/20* (2013.01)

(58) Field of Classification Search
CPC ........................... H01M 2/0217; H01M 2/263
USPC ........................................................ 429/94
See application file for complete search history.

(56) References Cited

U.S. PATENT DOCUMENTS

| | | | |
|---|---|---|---|
| 2008/0241679 A1 | 10/2008 | Okutani et al. | |
| 2008/0292962 A1* | 11/2008 | Jung | H01M 2/0275 429/211 |
| 2009/0087737 A1 | 4/2009 | Yamauchi et al. | |
| 2011/0076552 A1 | 3/2011 | Taniguchi et al. | |
| 2012/0270085 A1 | 10/2012 | Taniguchi et al. | |

(Continued)

FOREIGN PATENT DOCUMENTS

JP    2011-076867 A    4/2011

*Primary Examiner* — Basia Anna Ridley
*Assistant Examiner* — James M Erwin
(74) *Attorney, Agent, or Firm* — Westerman, Hattori, Daniels & Adrian, LLP

(57) ABSTRACT

The thickness of a terminal connection portion of a positive electrode current collector is greater than that of a terminal connection portion of a negative electrode current collector. The terminal connection portion of the positive electrode current collector has a through-hole, and a positive electrode terminal is inserted into the through-hole and is upset on the terminal connection portion. The terminal connection portion of the negative electrode current collector has a through-hole, and a negative electrode terminal is inserted into the through-hole and is upset on the terminal connection portion. A recessed portion is formed in a lower surface of the positive electrode terminal connection portion around the through-hole, and a lower end portion of the positive electrode terminal is disposed in the recessed portion.

6 Claims, 11 Drawing Sheets

(56) References Cited

U.S. PATENT DOCUMENTS

2014/0234669 A1* 8/2014 Byun .................. H01M 2/0217
429/7

* cited by examiner

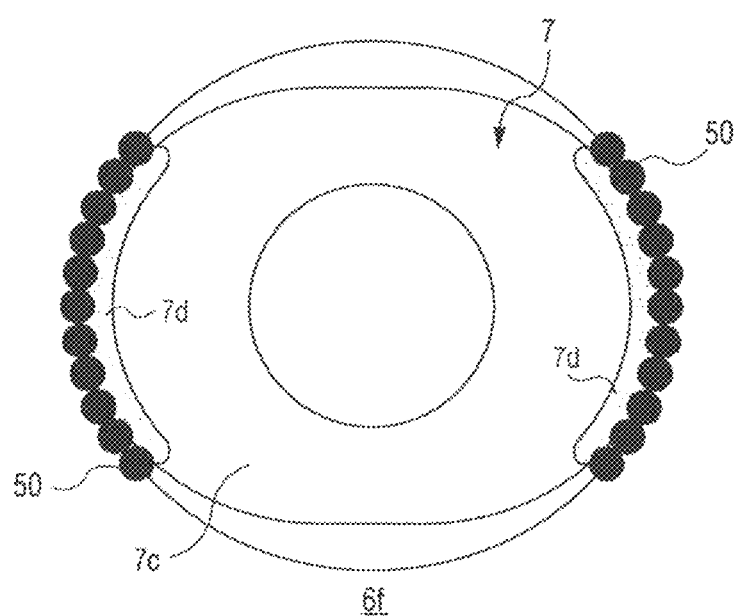

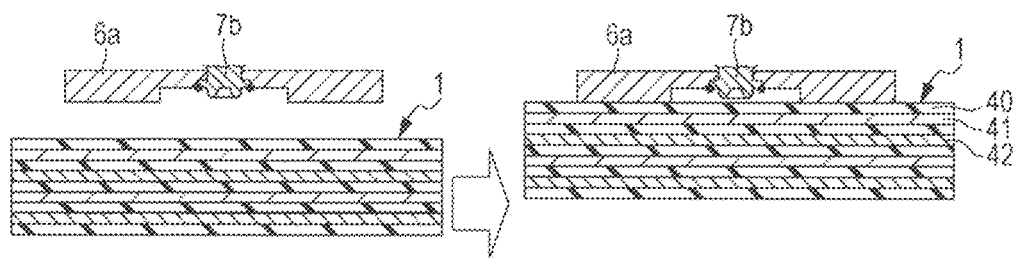
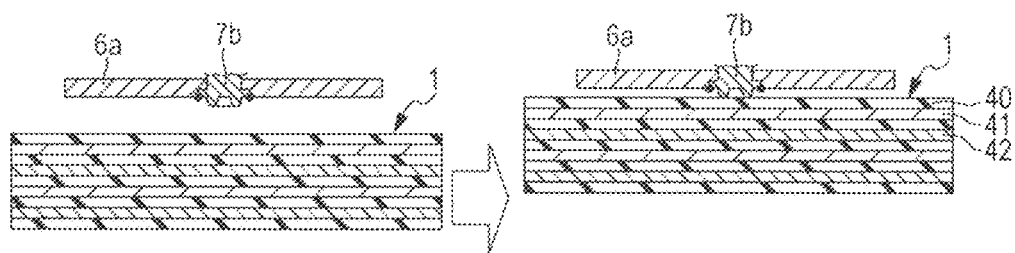

SECONDARY BATTERY

CROSS REFERENCE TO RELATED APPLICATIONS

The present invention application claims priority to Japanese Patent Application No. 2014-241078 filed in the Japan Patent Office on Nov. 28, 2014, the entire contents of which are incorporated herein by reference.

BACKGROUND OF THE INVENTION

Field of the Invention

The present invention relates to the structure of a secondary battery.

Description of Related Art

Alkaline secondary batteries and nonaqueous electrolyte secondary batteries are used as power sources of electric vehicles (EV) and hybrid electric vehicles (HEV, PHEV). When using such secondary batteries as automotive batteries for EV, HEV, PHEV, and the like, a high capacity and a high output power performance are required. Therefore, an assembled battery, in which a large number of secondary batteries are connected in series or in parallel, is used.

Each of these secondary batteries includes a battery case that is composed of a metal housing, which has an opening, and a sealing plate, which seals the opening. An electrode body and air electrolyte are disposed in the battery case. The electrode body includes a positive electrode plate, a negative electrode plate, and a separator. A positive electrode terminal and a negative electrode terminal are fixed to the sealing plate. The positive electrode terminal is electrically connected to the positive electrode plate through a positive electrode current collector. The negative electrode terminal is electrically connected to the negative electrode terminal through a negative electrode current collector.

Regarding a method of connecting a terminal to a current collector, for example, Japanese Published Unexamined Patent Application No. 2011-76867 (Patent Document 1) describes a technology for connecting a terminal to a current collector by forming a through-hole in the current collector, inserting a lower end portion of the terminal into the through-hole, and upsetting the lower end portion of the terminal.

Particularly good output power performance is required for secondary batteries used in hybrid electric vehicles (HEV, PHEV) and the like. Therefore, it is necessary to develop secondary batteries having, reduced internal resistance.

BRIEF SUMMARY OF THE INVENTION

An object of the present invention is to provide a secondary battery having a reduced internal resistance.

To achieve the object, a secondary battery includes a housing that has an opening, a sealing plate that has a first through-hole and a second through-hole and that seals the opening, an electrode body that includes a positive electrode plate and a negative electrode plate and that is disposed in the housing, a positive electrode terminal that extends through the first through-hole and that is electrically connected to the positive electrode plate, a negative electrode terminal that extends through the second through-hole and that is electrically connected to the negative electrode plate, a positive electrode current collector that is connected to the positive electrode plate and the positive electrode terminal, and a negative electrode current collector that is connected to the negative electrode plate and the negative electrode terminal. The positive electrode current collector is made of aluminum or an aluminum alloy. The negative electrode current collector is made of copper or a copper alloy. The positive electrode current collector includes a plate-shaped positive electrode terminal connection portion that is disposed between the sealing plate and the electrode body and to which the positive electrode terminal is connected. The negative electrode current collector includes a plate-shaped negative electrode terminal connection portion that is disposed between the sealing plate and the electrode body and to which the negative electrode terminal is connected. The thickness of the positive electrode terminal connection portion is greater than that of the negative electrode terminal connection portion. The positive electrode terminal connection portion has a third through-hole, and the positive electrode terminal is inserted into the third through-hole and is upset on the positive electrode terminal connection portion. The negative electrode terminal connection portion has a fourth through-hole, and the negative electrode terminal is inserted into the fourth through-hole and is upset on the negative electrode terminal connection portion. A recessed portion is formed in a lower surface of the positive electrode terminal connection portion around the third through-hole. A lower end portion of the positive electrode terminal is disposed in the recessed portion.

It is possible to reduce the internal resistance of a secondary battery by increasing the thickness of a positive electrode current collector and the thickness of a negative electrode current collector. A component made of aluminum or an aluminum alloy can be machined more easily than a component made of copper or a copper alloy. Accordingly, in a case where the positive electrode current collector is made of aluminum or an aluminum alloy and the negative electrode current collector is made of copper or a copper alloy, in consideration of the ease of manufacture of the secondary battery, it is preferable to increase the thickness of the positive electrode current collector by a larger amount than to evenly increase the thickness of both of the positive electrode current collector and the negative electrode current collector. Because the specific gravity of aluminum or an aluminum alloy is smaller than that of copper or a copper alloy, it is possible to suppress the decrease of the specific energy of the battery by increasing the thickness of the positive electrode current collector by a larger amount than by evenly increasing the thickness of both of the positive electrode current collector and the negative electrode current collector.

Moreover, in the secondary battery described above, even when the thickness of the positive electrode terminal connection portion of the positive electrode current collector is increased, it is possible to suppress the decrease of the distance between the lower end of the positive electrode terminal and the electrode body. Accordingly, contact between the lower end of the positive electrode terminal and the electrode body can be prevented. In the secondary battery described above, even when the thickness of the positive electrode terminal connection portion of the positive electrode current collector is increased, it is not necessary to decrease the height of the electrode body to increase the distance between the lower end of the positive electrode terminal and the electrode body. Therefore, the secondary battery has a high energy density.

In the present specification, a side of the secondary battery on which the sealing plate is located is referred to as the upper side and a side of the secondary battery on which the bottom portion of the housing is located is referred to as the lower side. Preferably, the positive electrode current collector is made by bending a plate, and the negative electrode current collector is made by bending a plate.

Preferably, the recessed portion includes a bottom portion and a side wall, and the positive electrode terminal is not in contact with the side wall.

In the secondary battery, the housing may be a rectangular housing, the electrode body may a rolled electrode body, the rolled electrode body may be disposed in the rectangular housing in such a way that a roll axis of the rolled electrode body extends horizontally, and the negative electrode plate may be located above the positive electrode plate in an upper end portion of the rolled electrode body.

In the secondary battery, the positive electrode terminal may include a positive electrode flange portion that is disposed further outward from the sealing plate with respect to the battery, and the negative electrode terminal may include a negative electrode flange portion that is disposed further outward from the sealing plate with respect to the battery. The secondary battery may satisfy $T1/T2>L1/L2$, where L1 is a distance between the positive electrode flange portion and an upset portion of the positive electrode terminal, L2 is a distance between the negative electrode flange portion and an upset portion of the negative electrode terminal. T1 is the thickness of the positive electrode terminal connection portion, and T2 is the thickness of the negative electrode terminal connection portion. The ratio of (T1/T2) to (L1/L2) is preferably in the range of 1.2 to 3.0, and more preferably, in the range of 1.2 to 3.0.

BRIEF DESCRIPTION OF THE SEVERAL VIEWS OF THE DRAWINGS

FIG. 7 is an enlarged view of a portion VII of FIG. 2;

FIG. 8 is a view illustrating a case where a rolled electrode body moves toward the sealing plate;

FIG. 9 is a view illustrating a case where the rolled electrode body moves toward the sealing plate;

DETAILED DESCRIPTION OF THE INVENTION

Hereinafter, embodiments of the present invention will be described with reference to the drawings. First, referring to FIG. 1, the structure of a rectangular secondary battery 20 according to an embodiment will be described.

Figure 1A:
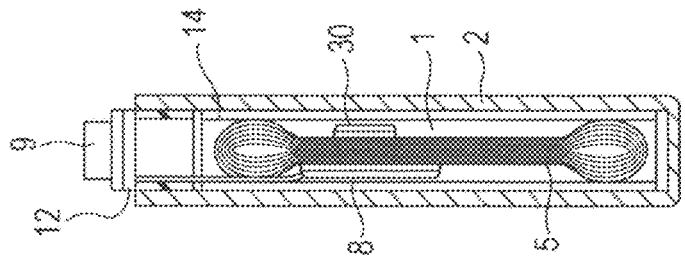
FIG. 1A is a sectional view of a secondary battery according to an embodiment.
Figure 1B:
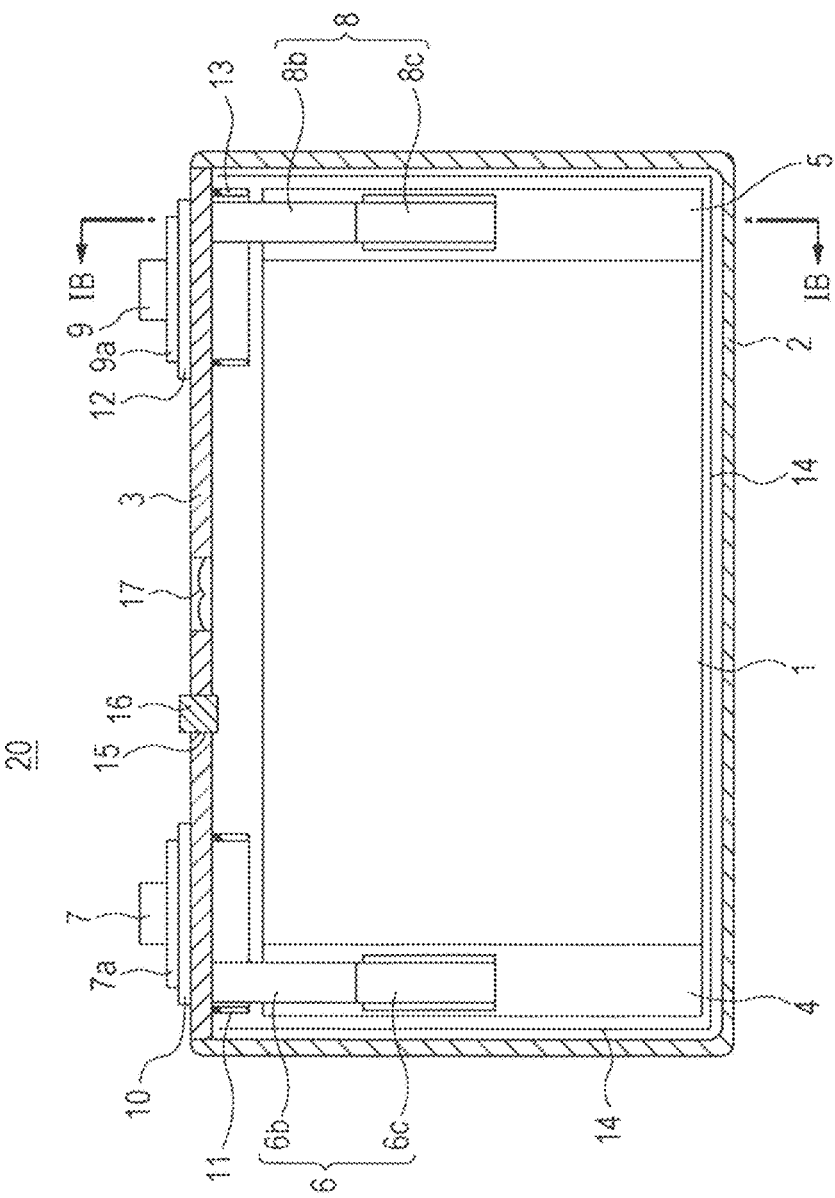
FIG. 1B is a sectional view taken along line IB-IB of FIG. 1A.

As illustrated in FIG. 1, the rectangular secondary battery 20 includes a rectangular housing 2 and a sealing plate 3. The rectangular housing 2 is made of a metal and has an opening in an upper part thereof. The sealing plate 3 is made of a metal and seals the opening. The rectangular housing 2 and the sealing plate 3 constitute a battery case. Preferably, the rectangular housing 2 and the sealing plate 3, each of which is made of a metal, are made of aluminum or an aluminum alloy. A rolled electrode body 1 and an electrolyte are disposed in the rectangular housing 2. The rolled electrode body 1 has a planar shape and includes a positive electrode plate not shown) and a negative electrode plate (not shown) that are rolled up with a separator (not shown) therebetween. The positive electrode plate is made by forming a positive electrode composite layer, including a positive electrode active material, on a positive electrode core that is made of a metal. The positive electrode plate has a portion on which the positive electrode core is exposed to the outside in the longitudinal direction. The negative electrode plate is made by forming a negative electrode composite layer, including a negative electrode active material, on a negative electrode core that is made of a metal. The negative electrode plate has a portion on which the negative electrode core is exposed to the outside in the longitudinal direction. Preferably, the positive electrode core is made of aluminum or an aluminum alloy, and the negative electrode core is made of copper or a copper alloy.

The rolled electrode body 1 includes a positive electrode core exposed portion 4, on which the positive electrode composite layer is not formed, on one side thereof in the roll axis direction; and a negative electrode core exposed portion 5, on which the negative electrode composite layer is not formed, on the other side thereof in the roll axis direction. A positive electrode current collector 6 is welded to the positive electrode core exposed portion 4. A positive electrode terminal 7 is connected to the positive electrode current collector 6. A negative electrode current collector 8 is welded to the negative electrode core exposed portion 5. A negative electrode terminal 9 is connected to the negative electrode current collector 8. A positive electrode current collector receiving component is disposed on a surface of the positive electrode core exposed portion 4 opposite to the surface on which the positive electrode current collector 6 is disposed. A negative electrode current collector receiving component 30 is disposed on a surface of the negative electrode core exposed portion 5 opposite to the surface on which the negative electrode current collector 8 is disposed.

The positive electrode terminal 7 and the positive electrode current collector 6 are respectively fixed to the sealing plate 3 through a gasket 10 and an insulating member 11. The negative electrode terminal 9 and the negative electrode current collector 8 are respectively fixed to the sealing plate 3 through a gasket 12 and an insulating member 13. The gaskets 10 and 12 are respectively disposed between the sealing plate 3 and the (positive electrode and negative electrode) terminals. The insulating members 11 and 13 are respectively disposed between the sealing plate 3 and the current collectors. The positive electrode terminal 7 includes a flange portion 7a, and the negative electrode terminal 9 includes a flange portion 9a. The rolled electrode body 1 is disposed in the rectangular housing 2 in a state in which the rolled electrode body 1 is covered by an insulation sheet 14. The insulation sheet 14, which covers the rolled electrode body 1, is disposed between the rolled electrode body 1 and the rectangular housing 2. The sealing plate 3 is welded to an edge of the opening of the rectangular housing 2 by laser welding or the like. The sealing plate 3 has an electrolyte injection hole 15. The electrolyte injection hole 15 is sealed with a sealing plug 16 after an electrolyte has been injected. A gas discharge valve 17, for discharging a gas when the pressure inside the battery becomes excessively high, is formed in the sealing plate 3.

Next, a method of making the rolled electrode body 1 will be described. A positive electrode plate is made as follows. First, positive electrode active material composite layers are formed by applying a positive electrode composite that includes a positive electrode active material, such as lithium cobalt oxide (LiCoO$_2$), to both surfaces of a rectangular aluminum foil having a thickness of 15 µm, which serves as a positive electrode core. Then, a positive electrode core exposed portion, to which the positive electrode active material composite is not applied and which has a predetermined width, is formed at one end of the aluminum foil in the transversal direction. A negative electrode plate is made as follows. First, negative electrode active material composite layers are formed by applying a negative electrode composite that includes a negative electrode active material, such as natural graphite powder, to both surfaces of a rectangular copper foil having a thickness of 8 µm, which serves as a negative electrode core. Then, a negative electrode core exposed portion, to which the negative electrode active material composite is not applied and which has a predetermined width, is formed at one end of the copper foil in the transversal direction.

The rolled electrode body 1 used in the embodiment is made by rolling up the positive electrode plate and the negative electrode plate, which have been obtained as described above, with a polyethylene porous separator therebetween in such a way that the positive electrode core exposed portion of the positive electrode plate and the negative electrode core exposed portion of the negative electrode plate are displaced from each other so that each of the electrode core exposed portions may not overlap the active material composite layer of a corresponding one of the opposing electrodes. The rolled electrode body 1 has a planar shape; the negative electrode core exposed portion 5, in which a plurality of copper foils are stacked, is disposed at one end of the rolled electrode body 1; and the positive electrode core exposed portion 4, in which a plurality of aluminum foils are stacked, is disposed at the other end of the rolled electrode body 1.

Next, how the positive electrode current collector 6 and the negative electrode current collector 8 are attached to the sealing plate 3 will be described.

Figure 2:
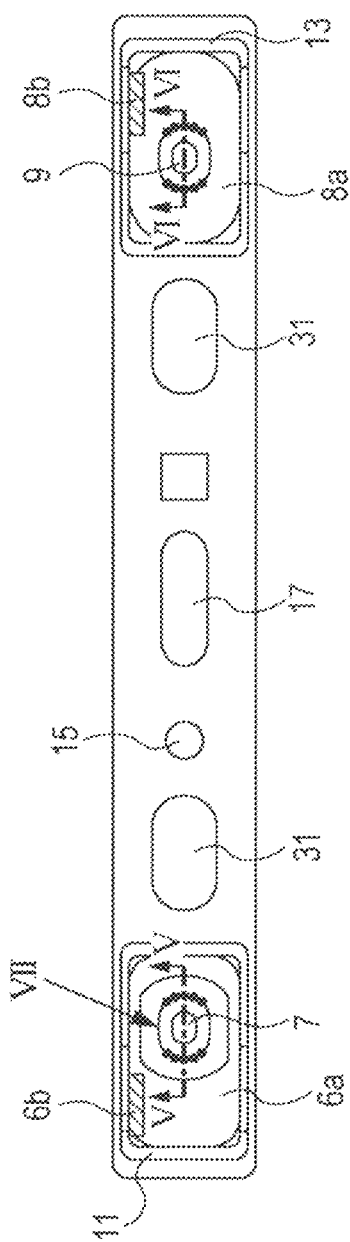
FIG. 2 is a plan view, from the inside of the second battery, of a sealing plate of the secondary battery according to the embodiment, to which a current collector has been attached.

As illustrated in FIGS. 1 and 2, at one end of the sealing plate 3 in the longitudinal direction, the gasket 10 is disposed on a surface of the sealing plate 3 outside the battery and the insulating member 11 is disposed on a surface of the sealing plate 3 inside the battery. The positive electrode terminal 7 is disposed on the gasket 10, and the positive electrode current collector 6 is disposed on the lower surface of the insulating member 11. The positive electrode terminal 7, the gasket 10, the sealing plate 3, the insulating member 11, and the positive electrode current collector 6 are integrally fixed to each other. The positive electrode current collector 6 includes a terminal connection portion 6a, a lead portion 6b, and a connection portion 6c. The terminal connection portion 6a, which has a plate-like shape, is disposed between the sealing plate 3 and the rolled electrode body 1 and connected to the positive electrode terminal 7. The lead portion 6b extends from an end of the terminal connection portion 6a toward the rolled electrode body 1. The connection portion 6c is located at an end of the lead portion 6b and connected to the positive electrode core exposed portion 4. The terminal connection portion 6a is disposed parallel to the sealing plate 3.

At the other end of the sealing plate 3 in the longitudinal direction, the gasket 12 is disposed on a surface of the sealing plate 3 outside the battery, and the insulating member 13 is disposed on a surface of the sealing plate 3 inside the battery. The negative electrode terminal 9 is disposed on the gasket 12, and the negative electrode current collector 8 is disposed on the lower surface of the insulating member 13. The negative electrode terminal 9, the gasket 12, the sealing plate 3, the insulating member 13, and the negative electrode current collector 8 are integrally fixed to each other. The negative electrode current collector 8 includes a terminal connection portion 8a, a lead portion 8b, and a connection portion 8c. The terminal connection portion 8a, which has a plate-like shape, is disposed between the sealing plate 3 and the rolled electrode body 1 and connected to the negative electrode terminal 9. The lead portion 8b extends from an end of the terminal connection portion 8a toward the rolled electrode body 1. The connection portion 8c is located at an end of the lead portion 8b and connected to the negative electrode core exposed portion 5. The terminal connection portion 8a is disposed parallel to the sealing plate 3.

Next, the positive electrode current collector 6 and the negative electrode current collector 8 will be described.

Figure 3:
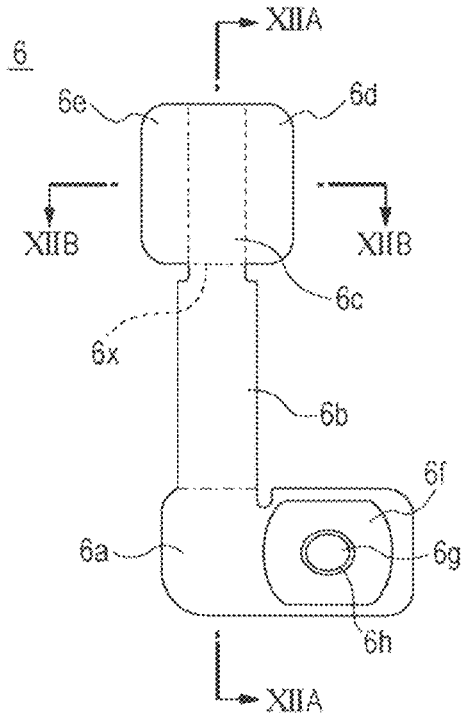
FIG. 3 is a plan view of a positive electrode current collector before being bent.

FIG. 3 is a plan view of the positive electrode current collector 6 before being bent, showing a surface facing, the rolled electrode body 1. The positive electrode current collector 6 includes the terminal connection portion 6a, the lead portion 6b, and the connection portion 6c. The lead portion 6b is bent up from the terminal connection portion 6a in FIG. 3. One end portion of the connection portion 6c in the width direction (the right end portion in FIG. 3) is bent down in FIG. 3 to become a first bent portion 6d. The other end portion of the connection portion 6c in the width direction (the left end portion in FIG. 3) is bent down in FIG. 3 to become a second bent portion 6e.

A recessed portion 6f is formed in the terminal connection portion 6a of the positive electrode current collector 6. The thickness of the recessed portion 6f is smaller than that of a base portion of the terminal connection portion 6a. A through-hole 6g is formed in the recessed portion 6f. A spot-faced hole 6h is formed in an end portion of the through-hole 6g inside the battery. The remaining thickness of the spot-faced hole 6h is smaller than that of the recessed portion 6f. In other words, the recessed portion 6f forms a first thin portion, which has a thickness smaller than that of the base portion of the terminal connection portion 6a, in the base portion; and the spot-faced hole 6h forms a second thin portion, which has a thickness smaller than that of the first thin portion, in the first thin portion.

The positive electrode current collector 6 is made of aluminum or an aluminum alloy. The thickness of the terminal connection portion 6a is 1.4 min, and the thickness of the lead portion 6b is 1.4 mm. The thickness of the connection portion 6c is 0.8 min, which is smaller than that of the lead portion 6b. Accordingly, a step portion 6x is formed between the lead portion 6b and the connection portion 6c. The step portion 6x is formed on a surface on the back side of the sheet of FIG. 3.

Figure 4:
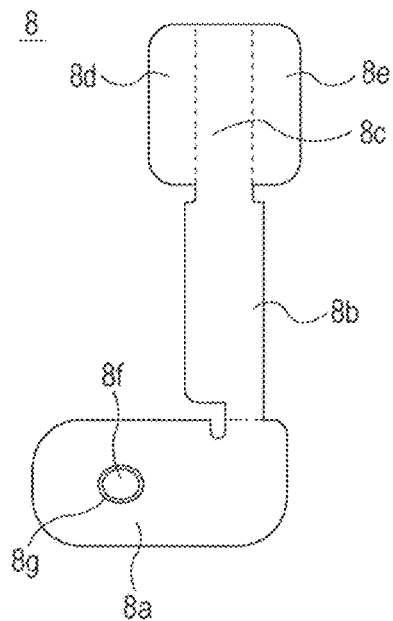
FIG. 4 is a plan view of a negative electrode current collector before being bent.

FIG. 4 is a plan view of the negative electrode current collector 8 before being bent showing a surface facing the rolled electrode body 1. The negative electrode current collector 8 includes the terminal connection portion 8a, the lead portion 8b, and the connection portion 8c. The lead portion 8b is bent up from the terminal connection portion 8a in FIG. 3. One end portion of the connection portion 8c in the width direction (the left end portion in FIG. 4) is bent down in FIG. 3 to become a first bent portion 8d. The other end portion of the connection portion 8c in the width direction (the right end portion in FIG. 4) is bent down in FIG. 3 to become a second bent portion 8e.

A through-hole 8f is formed in the terminal connection portion 8a of the negative electrode current collector 8. A spot-faced hole 8g is formed in an end portion of the through-hole 8f inside the battery. The remaining thickness of the spot-faced hole 8g is smaller than the thickness of the base portion of the terminal connection portion 8a. In other words, the spot-faced hole 8g forms a third thin portion, which has a thickness smaller than that of the base portion of the terminal connection portion 8a, in the base portion. The negative electrode current collector 8 is made of copper or a copper alloy. The surface of the negative electrode current collector 8 may be plated with a metal, such as Ni. The thickness of the negative electrode current collector 8 is 0.8 mm.

The positive electrode current collector 6 and the negative electrode current collector 8 may be bent before they are fixed to the sealing plate 3 or after they have been fixed to the sealing plate 3. For example, the first bent portion (6d, 8d) and the second bent portion (6e, 8e) may be bent with respect to the connection portion (6c, 8c) before fixing the current collector (6, 8) to the sealing, plate 3; and the lead portion (6b, 8b) may be bent with respect to the terminal connection portion (6a, 8a) after fixing the current collector (6, 8) to the sealing plate 3. Alternatively, the lead portion (6b, 8b) may be bent with respect to the terminal connection portion (6a, 8a) before fixing the current collector (6, 8) to the sealing plate 3. Further alternatively, the first bent portion (6d, 8d) and the second bent portion (6e, 8e) may be bent with respect to the connection portions (6c, 8c) after fixing the current collector (6, 8) to the sealing plate 3. Note that the current collector may have such a shape that the first bent portion or the second bent portion is not formed.

Next, a process of attaching the positive electrode current collector 6 and the negative electrode current collector 8 to the sealing plate 3 will be described. The positive electrode side will be described as an example, because the same method can be used for the positive electrode side and the negative electrode side. First, the gasket 10, the sealing plate 3, the insulating member 11, and the positive electrode current collector 6 are stacked so that the positions of through-holes in these members coincide with each other. An upset connection portion 7b, which is formed on one surface of the flange portion 7a of the positive electrode terminal 7, is inserted from the gasket 10 side into the through-holes in the gasket 10, the sealing plate 3, the insulating member 11, and the positive electrode current collector 6. By upsetting an end of the upset connection portion 7b, the positive electrode terminal 7, the gasket 10, the sealing plate 3, the insulating member 11, and the positive electrode current collector 6 are fixed to each other.

Figure 5:
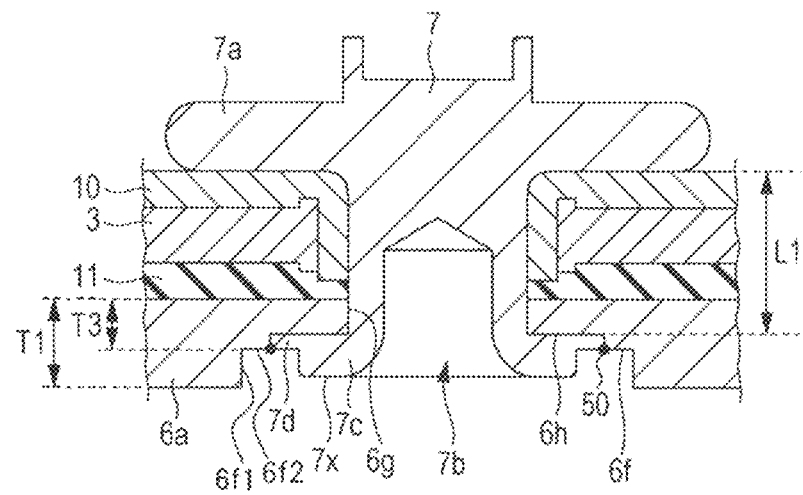
FIG. 5 is a sectional view taken along line V-V of FIG. 2.

FIG. 5 is a sectional view taken along line V-V of FIG. 2. A lower end portion of the upset connection portion 7b of the positive electrode terminal 7 is upset on the terminal connection portion 6a of the positive electrode current collector 6. An upset portion 7c of the upset connection portion 7b has an increased diameter in the spot-faced hole 6h, which is formed at a lower end of the through-hole of the terminal connection portion 6a. A thin portion 7d is formed at an end of the upset portion 7c in the direction in which the diameter of the upset portion 7c is increased. Preferably, welding spots 50 are formed by irradiating the boundary between the thin portion 7d and the terminal connection portion 6a with high-energy radiation. The upset portion 7c is located in the recessed portion 6f of the terminal connection portion 6a. The lower end portion of the positive electrode terminal 7 is located in the recessed portion 6f and does not protrude from the lower surface of the terminal connection portion 6a toward the rolled electrode body 1. FIG. 7 is an enlarged view of a portion VII of FIG. 2.

The thickness T1 of the terminal connection portion 6a is 1.4 mm, and the remaining thickness T3 of the recessed portion 6f is 0.8 mm. The distance L1 between the flange portion 7a of the positive electrode terminal 7 and the upset portion 7c of the positive electrode terminal 7 is 2.45 mm.

The recessed portion 6f includes a side wall 6f1 and a bottom portion 6f2. In a plan view, the recessed portion 6f is sufficiently larger than the upset portion 7c of the positive electrode terminal 7, and the positive electrode terminal 7 is not in contact with the side wall 6f1. By providing a certain distance between the side wall 6f1 and the positive electrode terminal 7, it is possible to prevent the side wall 6f1 from obstructing an operation of upsetting the lower end portion of the upset connection portion 7b.

Figure 6:
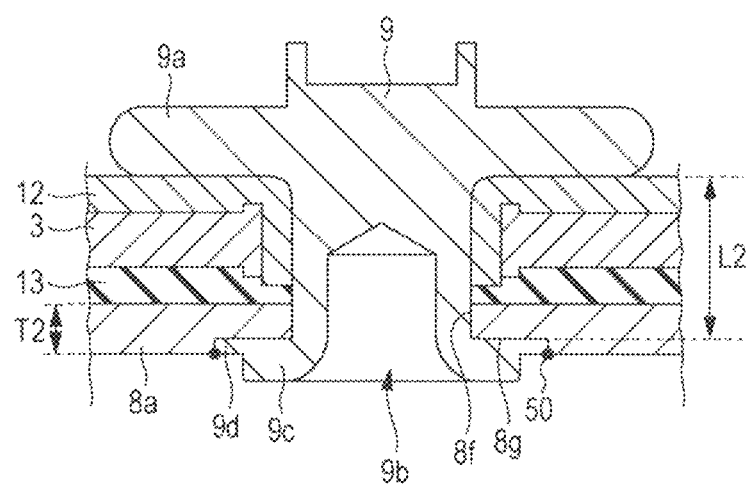
FIG. 6 is a sectional view taken along line VI-VI of FIG. 2.

FIG. 6 is a sectional view taken along line VI-VI of FIG. 2. A lower end portion of an upset connection portion 9b of the negative electrode terminal 9 is upset on the terminal connection portion 8a of the negative electrode current collector 8. An upset portion 9c of the upset connection portion 9b has an increased diameter in the spot-faced hole 8g, which is formed at a lower end of the through-hole of the terminal connection portion 8a. A thin portion 9d is formed at an end of the upset portion 9c in the direction in which the diameter of the upset portion 9c is increased. Preferably, welding spots 50 are formed by irradiating the boundary between the thin portion 9d and the terminal connection portion 8a with high-energy radiation.

The thickness T2 of the terminal connection portion 8a is 0.8 mm. The distance L2 between the flange portion 9a of the negative electrode terminal 9 and the upset portion 9c of the negative electrode terminal 9 is 2.45 mm.

In the secondary battery 20 according to the embodiment, the thickness T1 of the terminal connection portion 6a of the positive electrode current collector 6 is greater than the thickness T2 of the terminal connection portion 8a of the negative electrode current collector 8. However, because the recessed portion 6f is formed in the terminal connection portion 6a of the positive electrode current collector 6 and the upset portion 7c of the positive electrode terminal 7 is disposed in the recessed portion 6f, the position of the lower end portion of the positive electrode terminal 7 does not considerably protrude toward the rolled electrode body 1 as compared with the position of the lower end portion of the negative electrode terminal 9. Accordingly, it is not necessary to reduce the height of the rolled electrode body 1 to keep a distance between the lower end portion of the positive electrode terminal 7 and the rolled electrode body 1. As a result, it is possible to obtain a battery that has a high energy density as well as a good output power performance.

In the secondary battery 20 according to the embodiment, it is possible to provide a distance between the lower end portion of the positive electrode terminal 7 and an upper portion of the rolled electrode body 1. Therefore, even if the positive electrode current collector 6 becomes deformed due to a very strong impact or a long-time vibration and the rolled electrode body 1 moves toward the sealing plate 3, contact between the positive electrode terminal 7 and the rolled electrode body 1 can be suppressed.

Moreover, with the secondary battery 20 according to the embodiment, the following advantages can be obtained because the lower end portion of the positive electrode terminal 7 is located in the recessed portion.

As illustrated in FIG. 8, it is assumed that the positive electrode current collector 6 becomes deformed and the rolled electrode body 1 moves toward the sealing plate 3 due to a very strong impact or a long-time vibration. In this case, when the lower end portion of the positive electrode terminal 7 is located in the recessed portion as in the secondary battery 20 according to the embodiment, the upper end portion of the rolled electrode body 1 does not come into contact with the lower end portion of the positive electrode terminal 7 but comes into contact with the terminal connection portion 6a of the positive electrode current collector 6 over a larger area. In contrast, as illustrated in FIG. 9, if the lower end portion of the positive electrode terminal 7 protruded further toward the rolled electrode body 1 than the terminal connection portion 6a of the positive electrode current collector 6, the upper end portion of the rolled electrode body 1 would come into contact with the lower end portion of the positive electrode terminal 7 over a smaller area. Accordingly, with the secondary battery 20 according to the embodiment, which is structured so that the lower end portion of the positive electrode terminal 7 is located in the recessed portion, it is possible to reduce the probability that the lower end portion of the positive electrode terminal 7 penetrates through a separator 40 and comes into contact with a negative electrode plate 41 disposed inside the separator. Thus, because the lower end portion of the positive electrode terminal 7 is located in the recessed portion, a short circuit between the positive electrode and the negative electrode can be more reliably prevented.

Note that such an effect is particularly beneficial in a case where the negative electrode plate 41 is located above a positive electrode plate 42 in the upper end portion of the rolled electrode body 1, that is, the negative electrode plate is located on the outer side of the positive electrode plate.

Preferably, T1/T2>L1/L2. The ratio of (T1/T2) to (L1/L2) is preferably in the range of 1.2 to 3.0 and more preferably in the range of 1.5 to 3.0. T1/T2 is preferably in the range of 1.2 to 3.0 and more preferably in the range of 1.5 to 3.0.

Next, a method of assembling the battery will be described. The positive electrode current collector 6 and the negative electrode current collector 8, which have been fixed to the sealing plate 3, are respectively connected to the positive electrode core exposed portion 4 and the negative electrode core exposed portion 5 of the rolled electrode body 1. The rolled electrode body 1, which has been connected to the sealing plate 3 through the negative electrode current collector 8 and the positive electrode current collector 6, is inserted into the rectangular housing 2 in a state in which the periphery of the rolled electrode body 1 excluding the upper surface, is covered by the insulation sheet 14, which is made of a resin such as polypropylene and which has a bag-like shape or is bent to have a box-like shape. Thus, the insulation sheet 14 is located between the bottom surface of the rectangular housing 2 and the rolled electrode body 1 and between the four side surfaces of the rectangular housing 2 and the rolled electrode body 1. Subsequently, contact portions of the rectangular housing 2 and the sealing plate 3 are laser welded. Then, a nonaqueous electrolyte is injected through the electrolyte injection hole 15 of the sealing plate 3, and the electrolyte injection hole 15 is sealed with the sealing plug 16.

Figure 10:
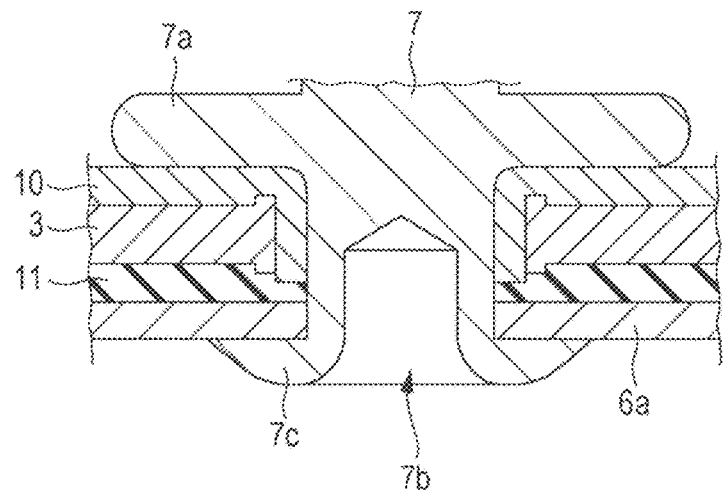
FIG. 10 is a view of a secondary battery according to a modification, corresponding to FIG. 5.
Figure 11:
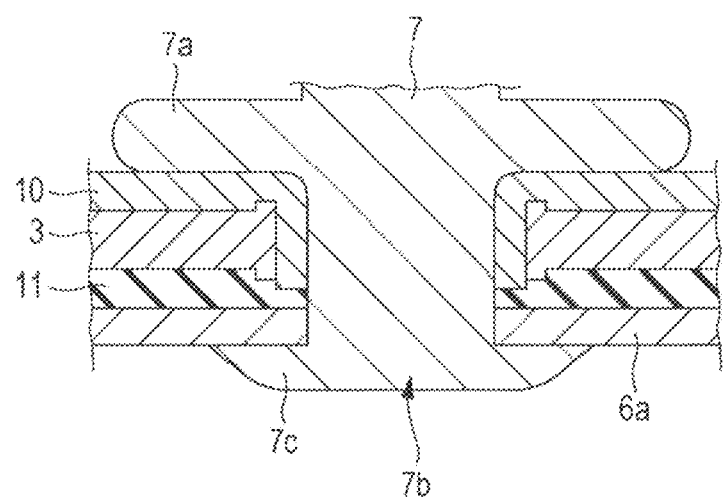
FIG. 11 is a view of a secondary battery according to a modification, corresponding to FIG. 5.

The secondary battery 20 according to the embodiment has the following structure: the spot-faced hole 6h is formed in a lower end portion of the through-hole 6g of the terminal connection portion 6a of the positive electrode current collector 6, and a lower end portion of the upset connection portion 7b of the positive electrode terminal 7 has an increased diameter in the spot-faced hole 6h; and the spot-faced hole 8g is formed in a lower end portion of the through-hole 8f of the terminal connection portion 8a of the negative electrode current collector 8, and a lower end portion of the upset connection portion 9b of the negative electrode terminal 9 has an increased diameter in the spot-faced hole 8g. However, this structure is not essential. As illustrated in FIGS. 10 and 11, a spot-faced hole need not be formed in the terminal connection portion. In the case where a spot-faced hole is formed, the shape of the spot-faced hole is not particularly limited. However, preferably, the spot-faced hole has such a shape that the upset portion of the terminal can have an increased diameter in the spot-faced hole.

In the secondary battery 20 according, to the embodiment, the upset connection portion 7b of the positive electrode terminal 7 and the upset connection portion 9b of the negative electrode terminal 9 have hollow cylindrical shapes. However, as illustrated in FIG. 11, the upset connection portion 7b of the positive electrode terminal 7 and the upset connection portion 9b of the negative electrode terminal 9 may have solid cylindrical shapes.

In the secondary battery 20 according to the embodiment, the recessed portion 6f is formed in the terminal connection portion 6a of the positive electrode current collector 6. As with the positive electrode side, a recessed portion may be formed in the terminal connection portion 8a of the negative electrode current collector 8. The positive electrode current collector 6 and the negative electrode current collector 8 may respectively have two lead portions (6b, 8b) and two connection portions (6c, 8c).

Figure 15A:
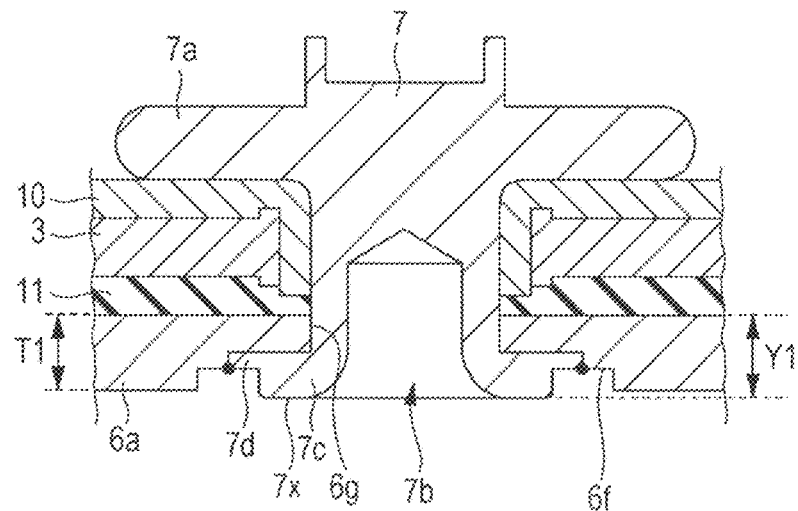
FIG. 15A is a view of a secondary battery according to another embodiment, corresponding to FIG. 5.
Figure 15B:
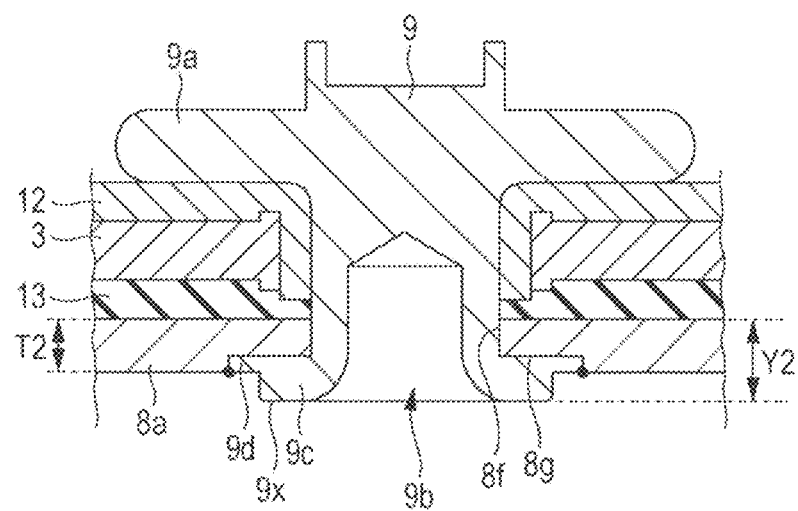
FIG. 15B is a view of the secondary battery according to the other embodiment, corresponding to FIG. 6.

As illustrated in FIGS. 15A and 15B, the thickness of the terminal connection portion 6a of the positive electrode current collector 6 is greater than that of the terminal connection portion 8a of the negative electrode current collector 8, and a lower end portion 7x of the positive electrode terminal 7 may be located closer to the rolled electrode body 1 than the terminal connection portion 6a is. In this case, preferably, T1/T2>1.2 and Y1/Y2<1.2, where Y1 is the distance between the upper surface of the terminal connection portion 6a of the positive electrode current collector 6 and the lower end portion 7x of the positive electrode terminal 7, Y2 is the distance between the upper surface of the terminal connection portion 8a of the negative electrode current collector 8 and the lower end of the negative electrode terminal 9, T1 is the thickness of the terminal connection portion 6a of the positive electrode current collector 6, and T2 is the thickness of the terminal connection portion 8a of the negative electrode current collector 8. With such a structure, it is possible to prevent the lower end portion 7x of the positive electrode terminal 7 from protruding considerably downward as compared with a lower end portion 9x of the negative electrode terminal 9. Thus, the secondary battery has a high energy density as well as a good output power performance. More preferably, 3>T1/T2>1.2 and 0.8<Y1/Y2<1.2.

Others

A secondary battery according to a second invention includes a housing that has an opening, a sealing plate that has a through-hole and that seals the opening, an electrode body that includes a positive electrode plate and a negative electrode plate and that is disposed in the housing, a terminal that extends through the through-hole and that is electrically connected to the positive electrode plate or the negative electrode plate, and a current collector that is electrically connected to the positive electrode plate or the negative electrode plate and to the terminal. The current collector includes a terminal connection portion, a lead portion, and a connection portion. The terminal connection portion is disposed between the sealing plate and the electrode body. The connection portion is connected to the positive electrode plate or the negative electrode plate. The lead portion extends from an end of the terminal connection portion toward the electrode body and connects the terminal connection portion to the connection portion. The thickness of the connection portion is smaller than the thickness of the terminal connection portion and is smaller than the thickness of the lead portion. At at least one end portion of the connection portion in a width direction, a bent portion is formed so as to stand on the connection portion.

The current collector according to the second invention may be either a positive electrode current collector or a negative electrode current collector. In the second invention the material of the current collector is not particularly limited. Preferably, the current collector is made of aluminum, an aluminum alloy, copper, or a copper alloy. In the second invention, a method for connecting the current collector to the terminal is not limited. The terminal may be welded to the terminal connection portion of the current collector. The terminal may be integrally formed with the terminal connection portion of the current collector.

Figure 12A:
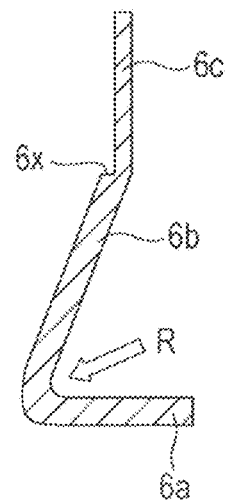
FIGS. 12A to 12C illustrate the positive electrode current collector after being bent, FIG. 12A showing a sectional view taken along line XIIA-XIIA of FIG. 3, FIG. 12B showing a sectional view taken along line XIIB-XIIB of FIG. 3, and FIG. 12C showing a plan view.
Figure 12B:
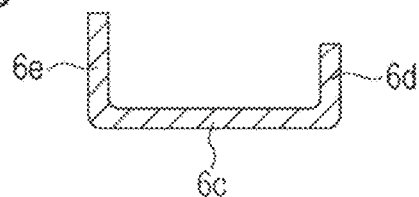
Figure 12C:
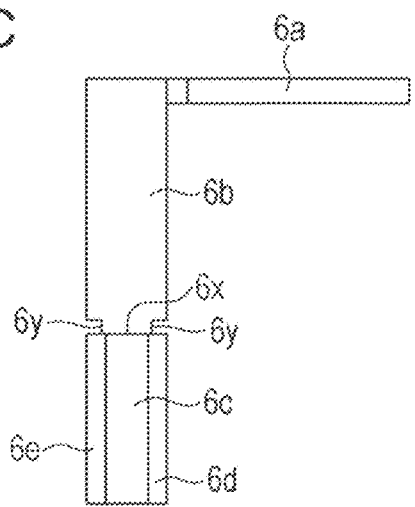

FIGS. 12A to 12C illustrate the positive electrode current collector 6 after being bent. FIG. 12A is a sectional view taken along line XIIA-XIIA of FIG. 3. FIG. 12B is a sectional view taken along line XIIB-XIIB of FIG. 3. FIG. 12C is a plan view.

As illustrated in FIGS. 12A and 12C, the lead portion 6b is formed so as to extend from an end of the terminal connection portion 6a toward the rolled electrode body 1. The connection portion 6c, which is to be connected to the positive electrode core of the positive electrode plate, is formed at an end of the lead portion 6b. The thickness of the terminal connection portion 6a is the same as that of the lead portion 6b, and the thickness of the connection portion 6c is smaller than that of each of the terminal connection portion 6a and the lead portion 6b. Therefore, the step portion 6x is formed at the boundary between the lead portion 6b and the connection portion 6c. The thickness of each of the terminal connection portion 6a and the lead portion 6b is 1.4 mm, and the thickness of the connection portion 6c is 0.8 mm.

As illustrated in FIGS. 12B and 12C, the connection portion 6c includes the first bent portion 6d and the second bent portion 6e. The connection portion 6c need not include both of the first bent portion 6d and the second bent portion 6e but may include only one of these.

When welding the connection portion 6c to the positive electrode core exposed portion 4, molten metal particles (metal spatter) may spatter toward the rolled electrode body 1 and may damage the rolled electrode body 1. When the first bent portion 6d is disposed inward in the width direction of the connection portion 6c (toward the center of the rolled electrode body 1), the first bent portion 6d serves as a barrier for preventing metal spatter from spattering toward the rolled electrode body 1. Examples of a method that can be used to connect the connection portion 6c to the positive electrode core exposed portion 4 include resistance welding, ultrasonic welding, and high-energy radiation welding such as laser welding. When resistance welding or ultrasonic welding is used, metal spatter tends to be generated between the outer surface of the positive electrode current collector 6 and a welding tool, such as a resistance welding electrode and an ultrasonic horn. When high-energy radiation welding is used, metal spatter tends to be generated on the outer surface of the positive electrode current collector 6, which is irradiated with high-energy radiation.

The width of the connection portion 6c cannot be increased due to structural limitations. Therefore, if the thickness of the entirety of the positive electrode current collector 6 is increased, it is difficult to bend the connection portion 6c and it is difficult to form the first bent portion 6d and the second bent portion 6e by bending end portions of the connection portion 6c.

However, as illustrated in FIG. 12A, when the thickness of the connection portion 6c is smaller than that of each of the terminal connection portion 6a and the lead portion 6b, it is easy to form the first bent portion 6d and the second bent portion 6e by bending end portions of the connection portion 6c. Accordingly, by using a positive electrode current collector having such a structure, it is possible to provide a highly reliable secondary battery that has a good output power performance and in which bent portions are formed. Although only the positive electrode current collector 6 is described above, the same effect can be obtained by structuring the negative electrode current collector in the same way.

Preferably, at the boundary between the lead portion 6b and the connection portion 6c, cutouts 6y are formed in end portions in the width direction and a step portion 6x is formed at the lower ends of the cutouts 6y. With such a structure, it is easy to perform bending along the boundary between the lead portion 6b and the connection portion 6c and bending along the boundary between the connection portion 6c and the first bent portion 6d or the second bent portion 6e. Thus, it is possible to make the shapes of current collectors be uniform to weld the current collector to the core exposed portion with high weld quality. In the case where only one of the first bent portion 6d and the second bent portion 6e is formed, the cutout 6y may be formed in only one end portion at which the bent portion is formed.

The boundary between the lead portion 6b and the terminal connection portion 6a has a gently curved shape (portion R in FIG. 12A). If the thickness of each of the terminal connection portion 6a and the lead portion 6b is increased, when the boundary between the terminal connection portion 6a and the lead portion 6b is bent to have a small bend radius R, a strong load is applied to the boundary. In contrast, when the bend radius R is large, it is possible to suppress application of a load to the boundary between the terminal connection portion 6a and the lead portion 6b. Accordingly, it is possible to prevent the positive electrode current collector 6 from becoming damaged or broken at the boundary between the terminal connection portion 6a and the lead portion 6b even if a very strong impact or a long-time vibration is applied to the battery. Preferably, the bend radius R is 2 mm or more. Instead of disposing the lead portion 6b so as to be perpendicular to the terminal connection portion 6a, as illustrated in FIG. 12A, the lead portion 6b may be disposed so as to be inclined at an angle of smaller than 90° with respect to the terminal connection portion 6a.

A rectangular secondary battery according to a third invention includes a rectangular housing that has an opening, a sealing plate that has a first through-hole and a second through-hole and that seals the opening, an electrode body that includes a positive electrode plate and a negative electrode plate and that is disposed in the rectangular housing, a positive electrode terminal that extends through the first through-hole and that is electrically connected to the positive electrode plate, a negative electrode terminal that extends through the second through-hole and that is electrically connected to the negative electrode plate, a positive electrode current collector that is electrically connected to the positive electrode plate and the positive electrode terminal, and a negative electrode current collector that is electrically connected to the negative electrode plate and the negative electrode terminal. The sealing plate includes a first recessed portion in a surface thereof outside the battery and a first protrusion at the center of the first recessed portion. The sealing plate includes a second recessed portion at a position that is inside the battery and opposite to the first recessed portion. The length of the second recessed portion in the longitudinal direction of the sealing plate is greater than that of the first recessed portion in the longitudinal direction of the sealing plate. The length of the second recessed portion in the transversal direction of the sealing plate is greater than that of the first recessed portion in the transversal direction of the sealing plate. The height of the first protrusion is greater than the depth of the first recessed portion.

In the third invention, the shape, the material, and the like of the each of the current collectors are not particularly limited. The material of each of the current collectors is not limited.

Figure 13A:
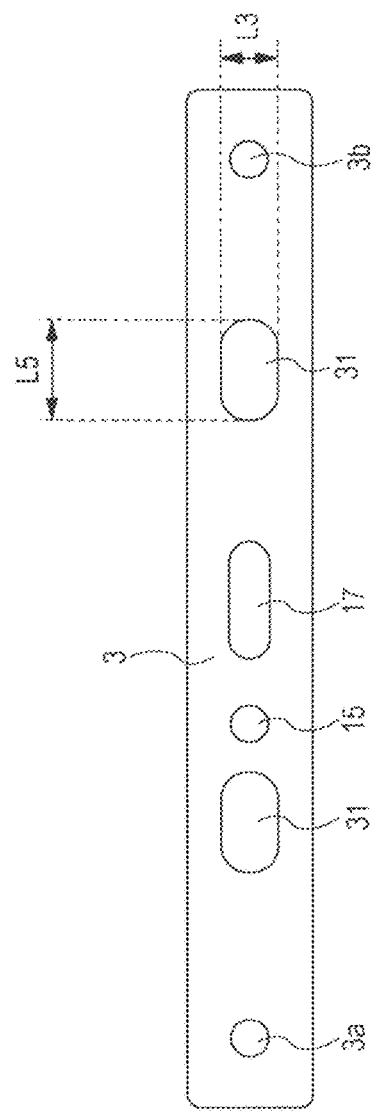
FIG. 13A is a plan view illustrating a surface of the sealing plate inside the battery.
Figure 13B:
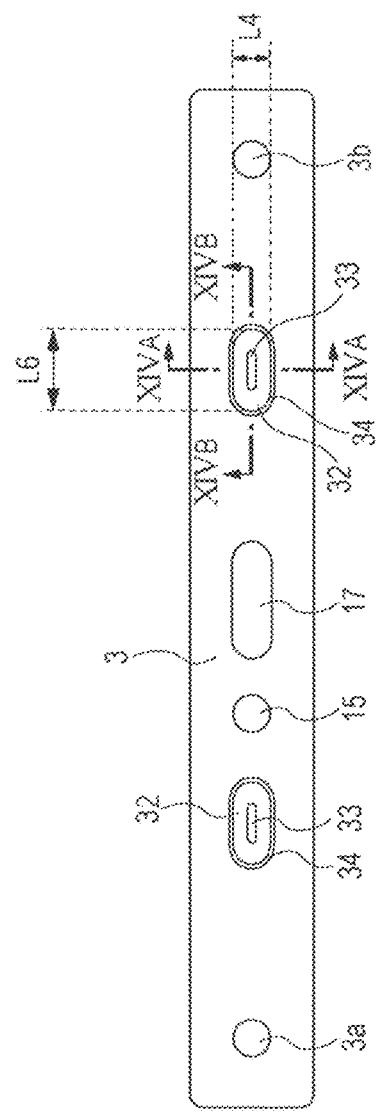
FIG. 13B is a plan view illustrating a surface of the sealing plate outside the battery.

FIG. 13A is a plan view illustrating a surface of the sealing plate 3 inside the battery and FIG. 13B is a plan view illustrating a surface of the sealing plate 3 outside the battery.

As illustrated in FIGS. 2 and 13A, back-side recessed portions (second recessed portions) 31 are formed in a surface of the sealing plate 3 inside the battery. As illustrated in FIG. 13B, front-side recessed portions (first recessed portions) 32 are formed in a surface of the sealing plate 3 outside the battery. The back-side recessed portions (second recessed portions) 31 are formed on the back side of the front-side recessed portions (first recessed portions) 32. In other words, the back-side recessed portions (second recessed portions) 31 are formed at positions opposite to the front-side recessed portions (first recessed portions) 32.

A first protrusion 33 is formed at a central portion of each front-side recessed portion (first recessed portion) 32. The height T of the first protrusion 33 (height from the bottom surface of the front-side recessed portion (first recessed portion) 32) is greater than the depth D of the front-side recessed portion (first recessed portion) 32. An annular protrusion 34 is formed along the edge of the front-side recessed portion (first recessed portion) 32. A linear groove 35 is formed at the center of the back-side recessed portion (second recessed portion) 31.

Because the sealing plate 3 has the back-side recessed portions (second recessed portions) 31, the front-side recessed portions (first recessed portions) 32, and the first protrusions 33, deformation of the sealing plate 3 can be suppressed even when the pressure inside the battery increases. Moreover, an external insulation member can be fitted onto each first protrusion 33 to serve as a displacement prevention mechanism. The external insulating member insulates the sealing plate 3 from an electroconductive member that is electrically connected to the positive electrode terminal or the negative electrode terminal.

The length of L3 of the back-side recessed portion 31 in the transversal direction of the sealing plate 3 is greater than the length L4 of the front-side recessed portion 32 in the transversal direction of the sealing plate 3. The length of L5 of the back-side recessed portion 31 in the longitudinal direction of the sealing plate 3 is greater than the length L6 of the front-side recessed portion 32 in the longitudinal direction of the sealing plate 3.

Preferably, the sealing plate has such a structure, because the width, the length, and the height of the first protrusion 33 can be easily increased with such a structure. This is because the back-side recessed portion 31, the front-side recessed portion and the first protrusion 33 are formed by press-forming.

As illustrated in FIGS. 13A and 13B, the sealing plate 3 has through-holes 3a and 3b, into which the positive electrode terminal and the negative electrode terminal are to be respectively inserted.

Figure 14A:
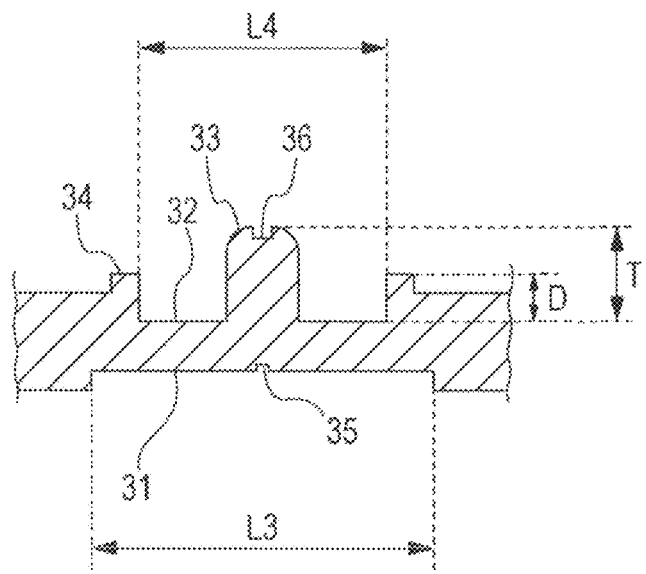
FIG. 14A is a sectional view taken along, line XIVA-XIVA of FIG. 13B.
Figure 14B:
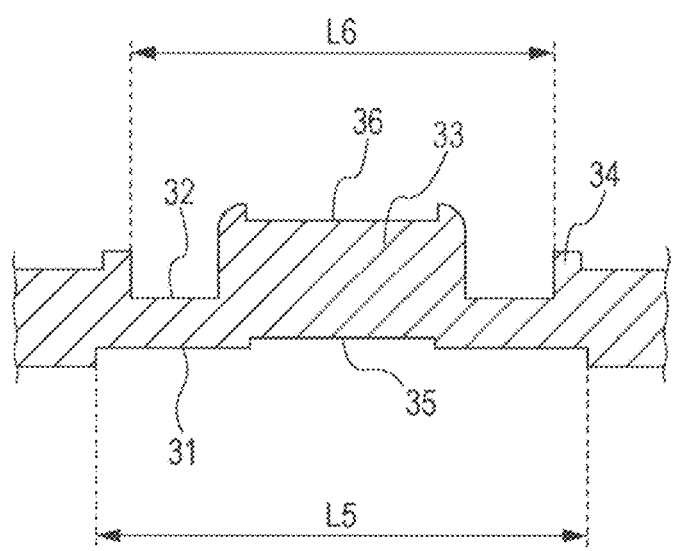
FIG. 14B is a sectional view taken along line XIVB-XIVB of FIG. 13B.

As illustrated in FIGS. 14A and 14B, an end recessed portion 36 is formed in the end portion of the first protrusion. The linear groove 35 is formed in a central portion of the back-side recessed portion 31. Thus, it is easy to increase the height and the width of the first protrusion 33 and it is possible to prevent the width of the end portion of the first protrusion 33 from becoming excessively smaller than the width of a base portion of the first protrusion 33.

In the embodiment described above, the rolled electrode body is an example of an electrode body disposed in the rectangular housing. Alternatively, the electrode body may be a stacked electrode body.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:
1. A secondary battery comprising:
a housing that has an opening;
a sealing plate that has a first through-hole and a second through-hole and that seals the opening;
an electrode body that includes a positive electrode plate and a negative electrode plate and that is disposed in the housing;
a positive electrode terminal that extends through the first through-hole and that is electrically connected to the positive electrode plate;
a negative electrode terminal that extends through the second through-hole and that is electrically connected to the negative electrode plate;
a positive electrode current collector that is connected to the positive electrode plate and the positive electrode terminal; and
a negative electrode current collector that is connected to the negative electrode plate and the negative electrode terminal,
wherein the positive electrode current collector is made of aluminum or an aluminum alloy, wherein the negative electrode current collector is made of copper or a copper alloy, wherein the positive electrode current collector includes a plate-shaped positive electrode terminal connection portion that is disposed between the sealing plate and the electrode body and to which the positive electrode terminal is connected, wherein the negative electrode current collector includes a plate-shaped negative electrode terminal connection portion that is disposed between the sealing plate and the electrode body and to which the negative electrode terminal is connected, wherein a thickness of the positive electrode terminal connection portion is greater than that of the negative electrode terminal connection portion, wherein the positive electrode terminal connection portion has a third through-hole, and the positive electrode terminal is inserted into the third through-hole and is upset on the positive electrode terminal connection portion, wherein the negative electrode terminal connection portion has a fourth through-hole, and the negative electrode terminal is inserted into the fourth through-hole and is upset on the negative electrode terminal connection portion, wherein a recessed portion is formed in a lower surface of the positive electrode terminal connection portion around the third through-hole, and wherein a lower end portion of the positive electrode terminal is disposed in the recessed portion.

2. The secondary battery according to claim 1, wherein the recessed portion includes a bottom portion and a side wall, and the positive electrode terminal is not in contact with the side wall.

3. The secondary battery according to claim 1, wherein the housing is a rectangular housing, wherein the electrode body is a rolled electrode body, wherein the rolled electrode body is disposed in the rectangular housing in such a way that a roll axis of the rolled electrode body extends horizontally, and wherein the negative electrode plate is located above the positive electrode plate in an upper end portion of the rolled electrode body.

4. The secondary battery according to claim 1, wherein the positive electrode terminal includes a positive electrode flange portion that is disposed further outward from the sealing plate with respect to the battery, wherein the negative electrode terminal includes a negative electrode flange portion that is disposed further outward from the sealing plate with respect to the battery, and wherein the secondary battery satisfies $T1/T2 > L1/L2,$ where L1 is a distance between the positive electrode flange portion and an upset portion of the positive electrode terminal, L2 is a distance between the negative electrode flange portion and an upset portion of the negative electrode terminal, T1 is the thickness of the positive electrode terminal connection portion, and T2 is the thickness of the negative electrode terminal connection portion.

5. The secondary battery according to claim 4, wherein a ratio of (T1/T2) to (L1/L2) is in a range of 1.2 to 3.0.

6. A secondary battery comprising:
a housing that has an opening;
a sealing plate that has a first through-hole and a second through-hole and that seals the opening;
an electrode body that includes a positive electrode plate and a negative electrode plate and that is disposed in the housing;
a positive electrode terminal that extends through the first through-hole and that is electrically connected to the positive electrode plate;
a negative electrode terminal that extends through the second through-hole and that is electrically connected to the negative electrode plate;
a positive electrode current collector that is connected to the positive electrode plate and the positive electrode terminal; and
a negative electrode current collector that is connected to the negative electrode plate and the negative electrode terminal, wherein the positive electrode current collector is made of aluminum or an aluminum alloy, wherein the negative electrode current collector is made of copper or a copper alloy, wherein the positive electrode current collector includes a plate-shaped positive electrode terminal connection portion that is disposed between the sealing plate and the electrode body and to which the positive electrode terminal is connected, wherein the negative electrode current collector includes a plate-shaped negative electrode terminal connection portion that is disposed between the sealing plate and the electrode body and to which the negative electrode terminal is connected, wherein a thickness of the positive electrode terminal connection portion is greater than that of the negative electrode terminal connection portion, wherein the positive electrode terminal connection portion has a third through-hole, and the positive electrode terminal is inserted into the third through-hole and is upset on the positive electrode terminal connection portion, wherein the negative electrode terminal connection portion has a fourth through-hole, and the negative electrode terminal is inserted into the fourth through-hole and is upset on the negative electrode terminal connection portion, wherein a recessed portion is formed in a lower surface of the positive electrode terminal connection portion around the third through-hole, and wherein the secondary battery satisfies $T1/T2 > 1.2$ and $Y1/Y2 < 1.2,$ where Y1 is a distance between an upper surface of the positive electrode terminal connection portion and a lower end portion of the positive electrode terminal, Y2 is a distance between an upper surface of the negative electrode terminal connection portion and a lower end portion of the negative electrode terminal, T1 is the thickness of the positive electrode terminal connection portion, and T2 is the thickness of the negative electrode terminal connection portion.

* * * * *